July 2, 1968  M. SEIDENBERG  3,390,459
DENTAL APPARATUS AND METHOD
Original Filed Sept. 17, 1959  3 Sheets-Sheet 1
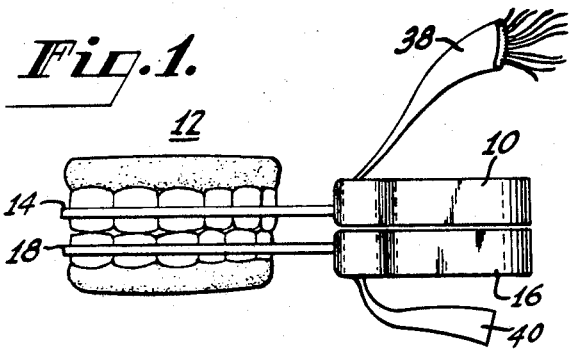
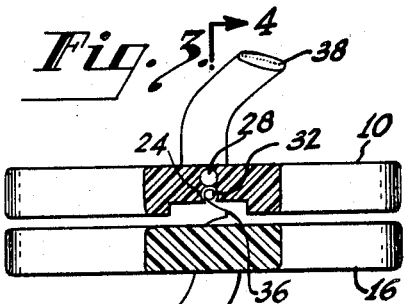
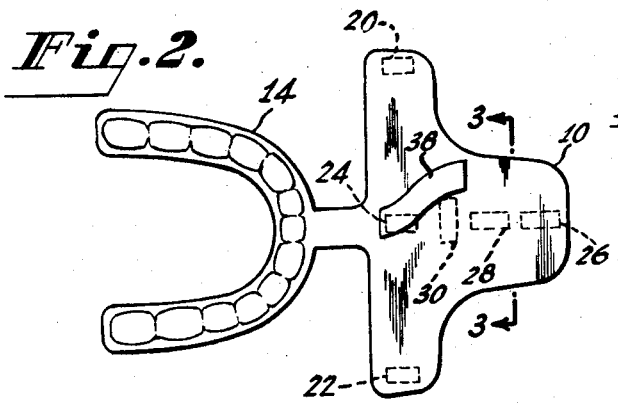
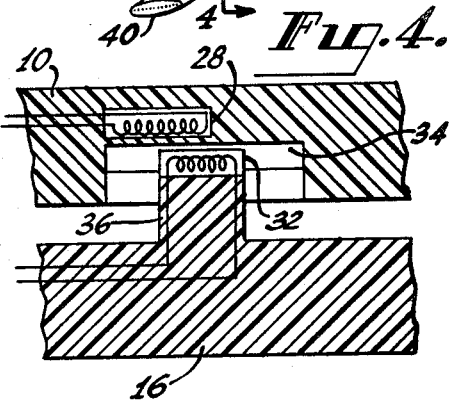
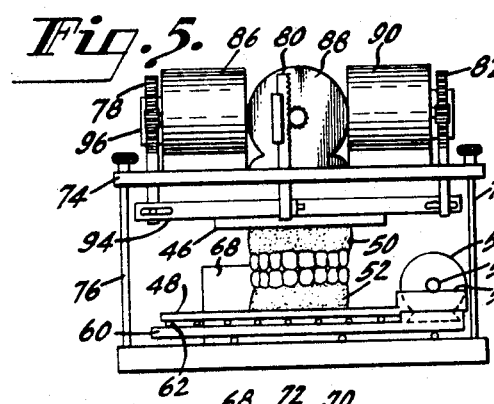
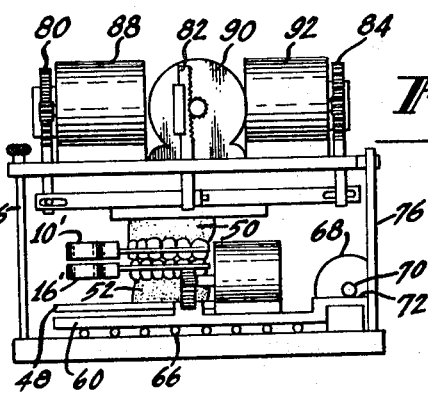
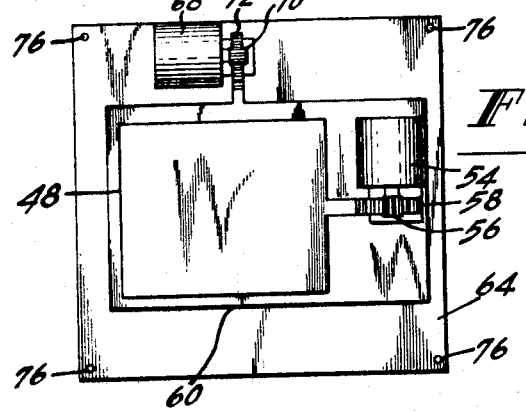
INVENTOR.
MURRAY SEIDENBERG July 2, 1968   M. SEIDENBERG   3,390,459
DENTAL APPARATUS AND METHOD
Original Filed Sept. 17, 1959   3 Sheets-Sheet 3
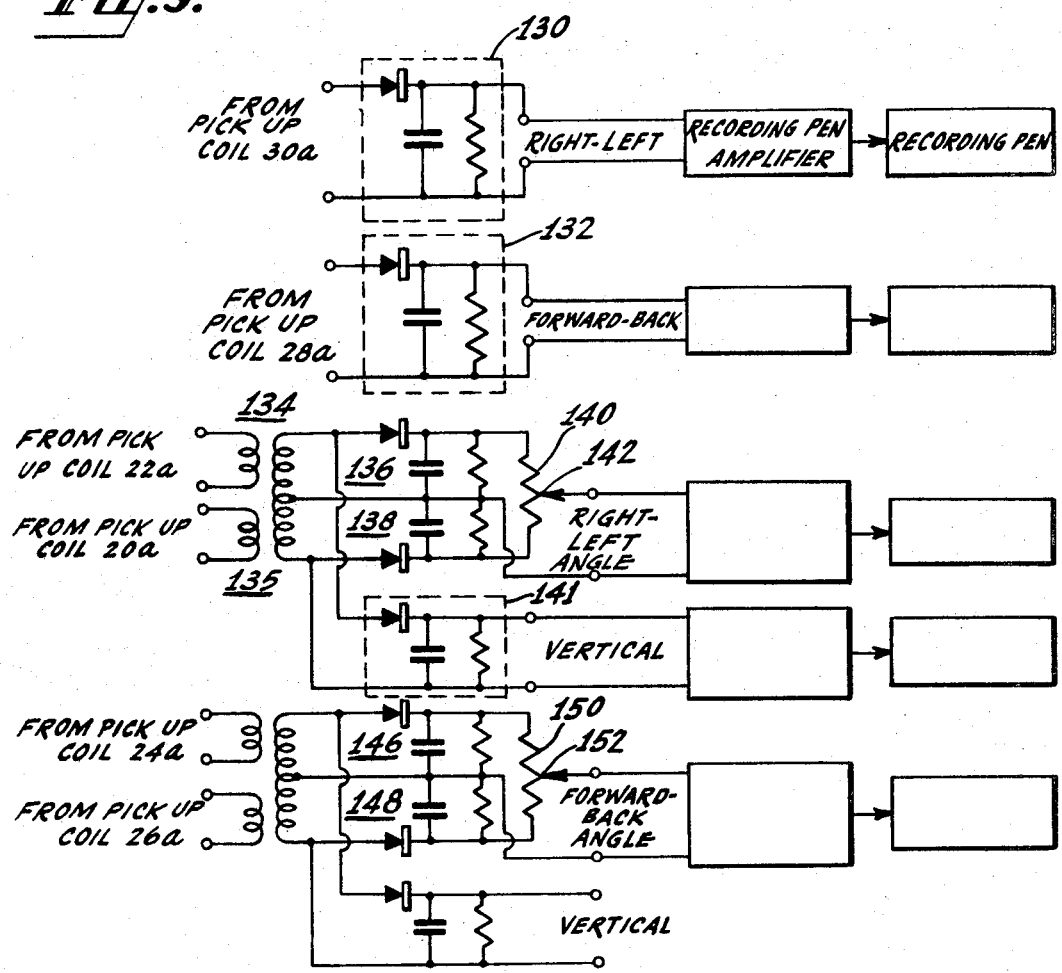
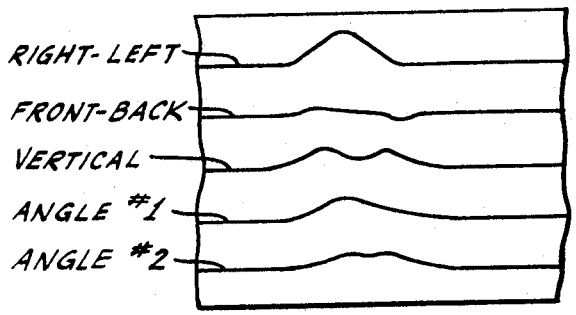
INVENTOR.
MURRAY SEIDENBERG United States Patent Office 3,390,459
Patented July 2, 1968

3,390,459
DENTAL APPARATUS AND METHOD
Murray Seidenberg, Highland Park, N.J.,
(89 Morris St., New Brunswick, N.J. 08901)
Original application Sept. 17, 1959, Ser. No. 840,636, now Patent No. 3,259,984, dated July 12, 1966. Divided and this application Aug. 17, 1965, Ser. No. 491,069
9 Claims. (Cl. 32—19)

This application is a division of my application Ser. No. 840,636, filed Sept. 17, 1959.

The present invention relates to new and improved methods and apparatus for use in dentistry. More particularly, the invention is concerned with novel means for recording the articulation of a person's jaws and means for employing the record thus made in causing a mechanical articulator to reproduce faithfully the original movements.

In the art of prosthetic dentistry, proper fabrication of partial or full dentures requires precise information regarding the patient's articulation, that is, the movements of his upper (maxillary) and lower (mandibular) jaws during normal chewing motion. Such information is necessary because of the complex relative motion which occurs between mandible and maxilla. The mandible is moveably supported through a curvilinear hinge mechanism known as the condyles so that none of the movements of mandible with respect to the maxilla is a simple, rectilinear motion. Rather, each movement from the centric, or rest, position is a complex one.

The basic articulatory movements, and those most significant in prosthetic dentistry are (1) the protrusive (fore and aft), (2) the lateral (right and left) and (3) the vertical (open and shut). The protrusive movement follows a curved path (the curve of Spee) and is further defined by the plane of occlusion or occlusal plane, which is the plane of the mean location of the tooth cusps in the centric position. The lateral movement also follows a curved path, as viewed in a vertical left-to-right plane, similar to that of a pendulum's arc. The actual curve is determined by the condylar location and varies between individuals. The vertical movement is a swinging motion about a horizontal pivot axis or hinge and is determined by the condylar hinge axis.

In view of the fact that partial or full artificial dentures must, for proper functioning, accommodate all of these movements and also meet and interdigitate properly in the centric position, there has long existed the need for a precise method of and means for measuring the masticatory movements of the jaws and simulating such movements with the fabricated dentures to determine their fit. Thus, there have been many proposals in the past of apparatus for recording such movements and of apparatus for simulating the movements thus recorded. These prior art proposals have, however, involved the use of elaborate apparatus in connection with the patient, such as lights and mirrors and/or large and heavy implements for securing recording pens to the jaws of the patient. These proposals have not, however, performed all of the necessary functions described above, so that present-day techniques of prosthetic dentistry involve much of the empirical and require numerous fittings of dentures before even acceptable functioning thereof is realized.

It is, therefore, a primary object of the present invention to provide new and improved means for and method of precisely measuring articulatory movements.

Another object of the invention is to provide novel means for accurately recording articulatory movements to produce a dynamic record thereof.

Still another object is to provide a new and improved mechanical articulator which is capable of faithfully reproducing, from such a record, the articulation of a patient's mouth.

In general, the present invention comprises a novel method of and system for accurately measuring, recording and reproducing the articulation of a patient's jaws, useful both in dental research and in the fabrication of dentures. The measuring and recording are performed, in accordance with one form of the invention, by means of magnetic field-producing and field-responsive means secured to the maxilla and mandible in such relation that the field-responsive means produce electrical signals in response to relative movement of the jaws, the amplitude and polarity of the signal being representative of the extent and sense of the relative movement. Means are provided for recording such signals. The invention also provides a novel mechanical articulator which, through the agency of electromechanical servo means, responds to the recorded electrical signals to simulate faithfully the original articulation.

By means of the present invention, a dentist may, using extremely small and lightweight devices, make an accurate record of the articulation of a patient. This record may then be furnished, together with the usual impressions and models of the patient's teeth, to the dental technician who, after having fabricated dentures according to the impressions, can then determine with precision the existence of and reason for any malfunctioning of the dentures. This determination is readily made by means of the record-controlled articulator which moves the artificial dentures substantially as they would have been moved by the patient's jaws. It will be appreciated, therefore, that the present invention greatly simplifies prosthetic dentistry, eliminating much of the trial and error of present techniques.

Additional objects and advantages of the present invention will become apparent to those skilled in the art from a study of the following detailed description of the accompanying drawing, in which:

FIG. 1 is a side elevation of position-sensing elements in accordance with the invention affixed to the teeth of a patient;

FIG. 2 is a top plan view of the structure shown in FIG. 1;

FIGS. 3 and 4 are partial sectional views of the position-sensing elements shown in FIGS. 1 and 2 along the lines indicated;

FIG. 5 is a front elevation of an articulator in accordance with the invention;

FIG. 6 is a side elevation of the articulator shown in FIG. 5;

FIG. 7 is a horizontal sectional view taken along the line 7—7 of FIG. 5;

FIG. 9 is a schematic circuit diagram of an electrical detecting and matrixing circuit for providing electrical signals representative of the relative movements of the patient's jaws as determined by the position-sensing elements of FIGS. 1 and 2, and FIG. 10 is a fragmentary view of one form of record which may be produced by means of the circuitry and apparatus of FIG. 9.

Figure 8:
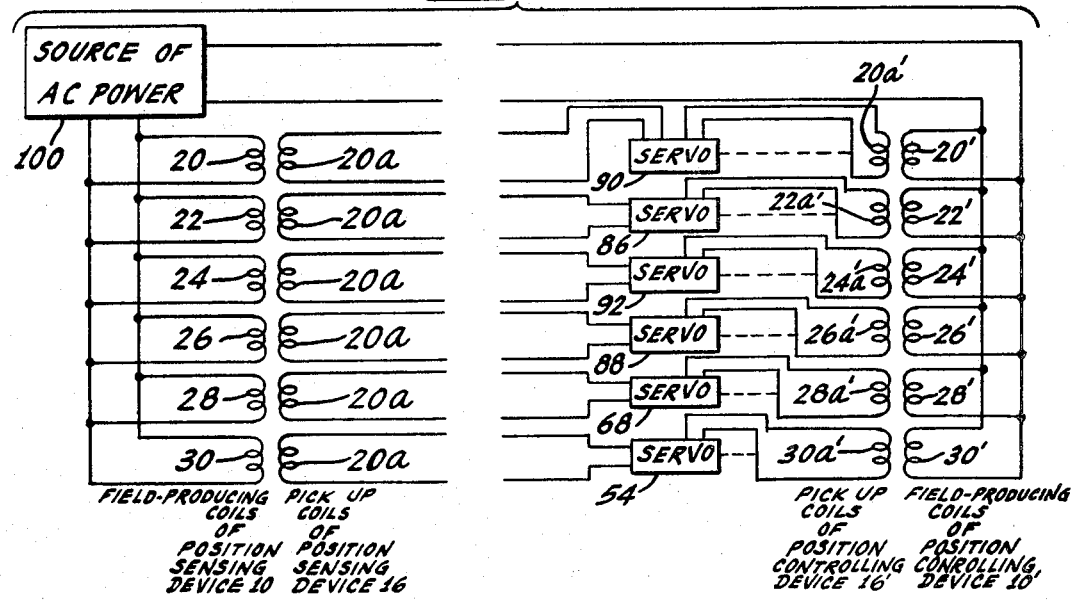
FIG. 8 is a schematic circuit diagram of the electrical connections between the position-sensing mechanism of FIGS. 1 and 2 and the articulator of FIGS. 5, 6 and 7.

Referring to the drawing and in particular, to FIGS. 1 and 2, there is shown a position-sensing mechanism to determine the relative positions of a patient's jaws as the jaws are moved in a masticatory fashion. This mechanism comprises an upper position-sensing element 10 which is detachably secured to the teeth of the maxilla of the upper jaw, indicated generally at 12, by means of an arch or matrix 14. A lower sensing element 16 is similarly secured to the teeth of the mandible by a second arch or matrix 18. The arches 14 and 18 may be of any well known form, such as the conventional "Winter" type arch. The upper and lower sensing elements 10, 16 are rigidly supported by the teeth so that movement of the upper and lower jaws relative to one another is directly transmitted to the elements 10 and 16. Thus, the relative movements of the elements 10 and 16 correspond to those of the jaws.

Basically, the upper position-sensing element 10 comprises an array of magnetic field-producing elements which are energized from an external source. The lower position-sensing element 16 comprises basically a corresponding array of magnetic field-sensing elements for deriving electrical voltages from the field-producing elements. These voltages are representative of the relative movements between the upper and lower sensing elements 10, 16. The elements 10 and 16 may be formed of plastic or other lightweight insulating material in which the several coils are imbedded. Thus these elements may be quite light and will not distort the mouth of the patient when used.

The magnetic field-producing coils 20, 22, 24, 26, 28 and 30 of the element 10 are shown in FIG. 2 of the drawing in one suitable arrangement. Coils 20 and 22, which are respectively on the extreme left and extreme right of the element 10, determine the angle defined in the lateral direction between the upper and lower jaws as they are moved. The coils 24 and 26 determine the angle made between the upper and lower jaws in a vertical fore and aft plane.

The lower position-sensing element 16 contains four identical coils which correspond in position in the lower element 16 to the coils 20, 22, 24 and 26. The coils in the lower element 16 are, in the interest of simplicity, not shown in the drawing. It will be understood, however, that these coils are located in the lower element 16 directly adjacent to and oriented in the same direction as the coils 20, 22, 24 and 26, respectively. The coils in the lower element 16 are not energized from an external power source, but, rather, are energized through inductive coupling with the coils 20, 22, 24 and 26, in a manner to be described more fully hereinafter.

The position-sensing elements include, in addition to the coils already noted, two additional coils. One of these additional coils is shown at 32 in the vertical sectional view of FIG. 3. Although this coil is physically supported in a slide-way 34 formed in the lower surface of the upper element 10, it constitutes a pickup coil and is energized by flux produced by the magnetic coil 28. The coil 32 is slidable in a direction parallel to the coil 28 and is connected mechanically to the lower element 16 by means of a flexible strap 36 which is of sufficient length to accommodate opening of the jaws and which transmits mechanical fore and aft movement (protrusive) of the lower jaw to the pickup coil 32. The strap 36 may be formed of a relatively stiff plastic material.

The coil 32 is shown in side elevation in the vertical sectional view of FIG. 4 in which its relation to the energizing coil 28 may be better seen. The second of the above-mentioned additional coils is not shown in the drawings but is similarly supported in a slide-way parallel to and beneath the energizing coil 30 in the upper sensing element 10. That is to say, this coil is mechanically connected to the lower element 16 through a strap similar to the strap 36 but is at right angles to the coil 32 and is movable in a direction parallel to the orientation of the coil 30 in response to lateral movement of the jaws. The straps such as strap 36 may be several centimeters long when expended, thereby to permit normal opening of the patient's mouth.

From the foregoing, it will be recognized that each of the coils 20, 22 24, 26, 28 and 30, is energized from a suitable source such as a step-down transformer connected to the power mains, and produces continuously an alternating magnetic field. The voltage applied to these coils may be of small value. The pickup coils of the lower element 16 which are respectively associated with the field-producing coils of the upper element 10 will have induced therein voltages through inductive coupling with the field-producing coils. The amount of voltage thus induced in any one of the pickup coils associated with the element 16 will vary as a function of the distance of the pickup coil from its associated field-producing coil.

The leads through which energizing current is applied to the field-producing coils of the upper element 10 are shown extending from a flat insulated cable 38. Two such leads are provided for each of the coils in the element 10. Each of the pickup coils in the lower element 16 has two output leads which are carried in a flat insulated cable 40. In this manner, the voltage induced across each of the pickup coils associated with the element 16 is presented across the output leads connected to its ends.

FIGS. 5, 6 and 7 are views of a novel articulator in accordance with one specific form of the present invention. The articulator comprises basically an upper supporting plate 46 and a lower supporting plate 48, together with associated mounting and driving mechanisms. The upper supporting plate 46 is adapted to support an upper set of artificial dentures 50 and the lower plate 48 is similarly adapted to support a lower set of artificial dentures 52. The mechanism of the articulator is adapted to mechanically move the dentures 50 and 52 relative to one another in the same manner as the teeth of a patient are moved. The lower plate 48 may be moved fore and aft (to the left and right as shown in FIG. 5) and in and out of the plane of the paper (as viewed in the same figure). The upper plate 46, however, is adapted to move vertically and may also be moved to various angular positions with respect to the lower plate 48. The movements of the upper and lower plates 46 and 48 are accomplished by the use of servomotors, which may be of a well known type wherein the angular position of the rotor of the servomotor is determined by an input signal applied to the motor.

The lower plate 48 is driven in a direct left-to-right manner (as viewed in the drawing of FIG. 5) by a servomotor 54 which has connected to its rotor shaft a pinion 56 which meshes with a rack 58 integral with the plate 48. The plate 48 is slideably mounted to a subplate 60 by a linear ball bearing mechanism 62 which rides in aligned raceways in the lower plate 48 and the subplate 60. The subplate 60 is slideably supported on a base member 64 by a ball bearing mechanism 66 and raceways at right angles to the support between the lower plate 48 and subplate 60. A second servomotor 68 is mounted on the base plate 64 and a second pinion 70 secured to the rotor of the motor 68 engages a second rack 72 on the subplate 60. Thus the servomotors 54 and 68 are adapted to move their associated plate and subplate at right angles to each other.

An upper supporting member 74 is supported in spaced relation to the base 64 by means of four vertical supports 76. Projecting vertically through openings in the upper supporting member 74 into the space between that member and the lower plate 48 are the free ends of four rack elements 78, 80, 82, and 84. It will be noted that rack elements 78, 80, 82, and 84 are shown in FIG. 5; rack elements 80, 82 and 84 are shown in FIG. 6.

Each of the rack elements 78, 80, 82 and 84 is driven by the pinion of a servomotor mechanism similar to that described in connection with servomotors 54 and 68. Specifically, a third servomotor 86 is connected to drive rack 78; a fourth servomotor is connected to drive a rack 80; a fifth servomotor is connected to drive a rack 82; and a sixth servomotor is connected to drive a rack 84. It will be moved in a vertical direction only. The bottom ends of the rack members 78, 80, 82 and 84 are slidably engaged with and support, respectively, the four ends of an X- shaped member 94 which supports the upper plate 46 on its under surface. Each of the racks is provided at its lower end with a pin which is slidably received by an elongated slot in the corresponding extremity of the member 94. As may be seen from FIG. 5, for example, each of the racks is maintained in mesh with its associated pinion by means of a slide, such as the slide 96 associated with the rack 78.

From the foregoing, it will be recognized that, through the agency of the four servomotors 86, 88, 90 and 92, any one or all of the four ends of the X-shaped member 94 may be moved up or down, so that, if desired, a wobbling movement may be imparted through suitable energization of a combination of these servomotors.

In FIG. 6 of the drawing, there are also illustrated in association with the artificial dentures 50 and 52 position-controlling elements 10' and 16' which serve, in a manner to be described hereinafter, to control the operation of the six servomotors shown in FIGS. 5 and 6. The elements 10' and 16' serve to cause the motors to move the plates 46 and 48 which they control, thereby to reproduce or simulate the original movements of the jaws of the patient to which the position-sensing elements 10 and 16 of FIG. 1 were secured. The position-controlling elements 10' and 16' are or may be identical, respectively, to the elements 10 and 16 of FIG. 1. In the interest of simplifying the drawing, the position-controlling elements 10' and 16' are shown only in the side elevational view of FIG. 6 and are not illustrated in FIG. 5. Also in the interest of simplicity, no electrical connections have been shown in FIGS. 5, 6 and 7, but the electrical connections are shown in FIG. 8.

FIG. 8 shows schematically a source 100 of AC power which supplies power in parallel to all six coils of the position-sensing element 10 as indicated in the figure. The source of power 100 drives directly, or through a recording medium as will be explained hereinafter, the field-producing coils of a position-controlling device 10' associated with the articulator. These latter coils are indicated as coils 20', 22', 24', 26', 28', and 30'. The pickup coils 20a, 22a, 24a, 26a, 28a and 30a are connected to provide one input signal to the respective servomotors at the articulator. Specifically, the pickup coil 20a is connected to the servomotor 90; the second pickup coil 22a is connected to the servomotor 86; pickup coil 24a is connected to the servomotor 92; pickup coil 26a is connected to the servomotor 88; pickup coil 28a is connected to the servomotor 68; and pickup coil 30a is connected to the servomotor 54. Corresponding pickup coils of the position-controlling device 16', which are numbered 20a', 22a', 24a', 26a', 28a' and 30a' are connected to the corresponding servomotors 90, 86, 92, 88, 68, and 54.

As an example of the operation of the circuit, assume that the coil 20 in the position-sensing device 10 generates a voltage V in the pickup coil 20a of the position-sensing device 16. The servomotor 90 rotates to move the rack 82 (shown in FIG. 6) to such a position that an equal voltage V is generated in coil 20a' of the position-controlling device 16'. The same servo action is accomplished for each of the pickup coils in the position-controlling device so that the voltages generated in the pickup coils of the position-controlling device are identical to the voltages of coils of the position-sensing device 16; this serves to move the dentures 50, 52 (shown in FIGS. 5 and 6) to the same position with respect to each other as that assumed by the position of the patient's teeth. The movement of the patient's jaw from one position to another will change the voltages generated in the pickup coils of the position-sensing device 16 and change the position, through servo action, of the position-controlling devices 10' and 16' at the articulator and thus continuously move the dentures 50 and 52 in the same manner as the jaws of the patient are articulated.

As an example of the action of the controlled articulator, assume that the patient merely moves his lower jaw a slight amount downward. It will be apparent that, because of the hinge-like action of the condyles for small movements, the plane of the upper teeth will be at a different angle with respect to the lower teeth in the fore and aft direction. This action will place the coil 26 at a farther distance from its corresponding pickup coil 26a than the field-producing coil 24 is from its corresponding pickup coil 24a. Thus, a larger voltage will be induced in coil 24a than will be induced in coil 26a. In order for the corresponding servomotors 88 and 92 to produce the same voltages in coils 24a' and 26a' as are induced in 24a and 26a, the coil 26a' must be moved a greater distance from the field-producing coil 26' of the position-controlling element 10' than is the coil 24a' from the field-producing coil 24'. In this particular example, the specific effect produced at the articulator would be to move the rack upward by a greater amount than the rack 84 to provide the proper angle between the field-producing and pickup coils at the articulator.

A like servo action is effective to produce the right-left angle by action of the coils 20 and 22 and the corresponding servomotors 90 and 86 associated therewith.

The right-left and fore and aft movements are more simply produced. As an example, assume that the lower jaw of the patient is moved in a forward direction to move the pickup coil 28a forward relative to the field-producing coil 28 of the position-sensing device. This action will induce a lesser voltage in the pickup coil 28a. The servomotor 68 at the articulator must then move the sub-base plate 60 forward so that the voltage generated in the pickup coil 28a of the position-controlling device 16' is the same as that generated in the pickup coil 28a of the position-sensing device 16. A similar action in a perpendicular direction is accomplished by the servomotor 54 and its associated pickup and field-producing coils.

As will now be recognized, the novel apparatus described thus far greatly simplifies the fabrication of partial or full artificial dentures. Thus, the dentist may, after having taken the impressions and located them through conventional means on the plates 46 and 48 of the articulator of FIGS. 5 and 6, secure the position-sensing elements 10 and 16 to the maxilla and mandible of the patient. Corresponding and identical position-controlling elements are connected to the impressions in the articulator. With the electrical connections shown in FIG. 8, movement of the patient's jaws will be faithfully simulated by the impressions mounted in the articulator, so that initial errors in the fabrication of the dentures may be readily determined and corrected. Through this method, the trial and error operations required by presently used techniques are greatly minimized.

Figure 8A:
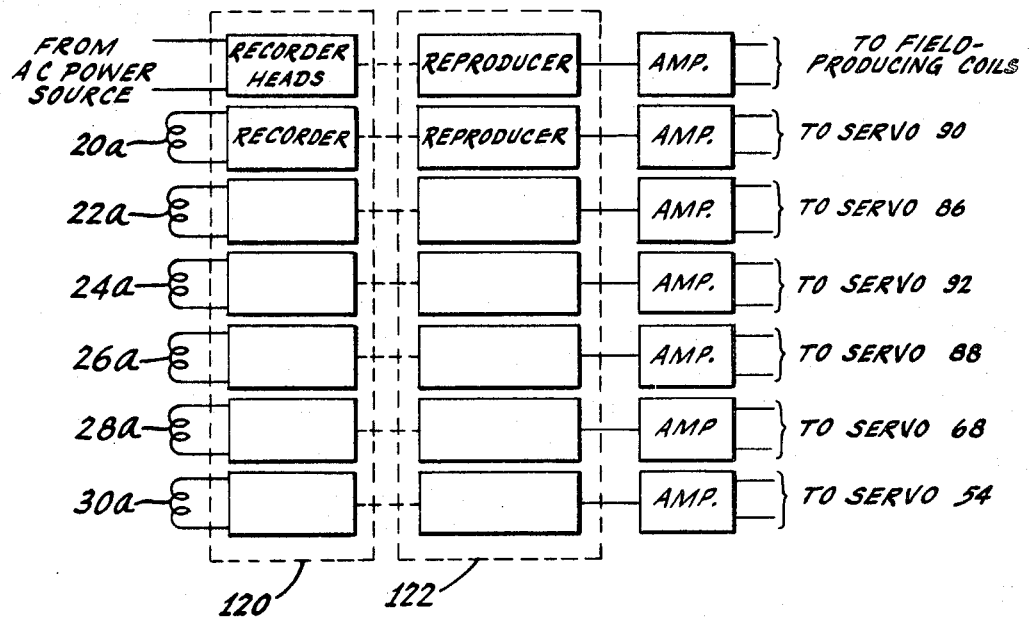
FIG. 8a is a partial schematic diagram of a modification of the arrangement of FIG. 8.

The apparatus and method described thus far contemplate a direct electrical connection between the articulator and the position-sensing elements. FIG. 8a illustrates a modification of the invention whereby the signals produced by the position-sensing elements 10 and 16 of FIG. 1 may be recorded to produce a permanent record. This record may then be employed at a different location, for example, in the technician's laboratory, and at a later time, to operate an articulator such as that shown in FIGS. 5 and 6 in the same manner as has been described for the directly-connected arrangement. Specifically, the signals produced by the pickup coils 20a–30a may be recorded on magnetic tape through the agency of recording heads such as those shown within the dotted line rectangle 120. These recording heads may be of any well known type such as those used with continuously moveable magnetic tape recording strips. Each of the heads will record its associated electrical signal in a corresponding track in the tape. Along with the signals from the pickup coils there is recorded on the tape the reference AC power signal from the source 100 (FIG. 8).

The signals thus recorded on the record may then, at any desired time after the initial fabrication of the artificial dentures, be reproduced by means of the magnetic reproducing heads shown within the dotted line rectangle 122. These reproducing heads may be of any well known type. The signals thus reproduced by mechanism 122 may be applied, after suitable amplification as shown in FIG. 8a, to the servomotors described in connection with FIG. 8.

As those skilled in the dental art will recognize from the foregoing, the arrangements thus far described may be effectively employed in connection with a set of standard or uniform movements of the patient's jaws which are made in response to the instructions from the dentist. Thus, the patient may be instructed to move his jaws in several specific directions in a predetermined order. This order of movement will be followed by the articulator of FIGS. 5 and 6 and the operation of the dentures carried thereby may be observed by the technician in accordance with the prearranged order of masticatory movements.

At present, the movements undergone by the condyles are little understood by the dental profession and accurate determination of such movements is difficult to obtain. The apparatus of the present invention is ideally suited for deriving information as to these movements.

One method of deriving such information from the voltages generated by the pickup coils of the lower position-sensing member 16 shown in FIG. 1 is illustrated in the circuit diagram of FIG. 9. The voltages from the pickup coils are detected to produce a direct (DC) voltage representative of the relative positions of the upper and lower jaws of the patient as the jaws are moved. The voltage from pick coil 30a, which indicates movement in the right-left direction is applied to a diode detector circuit 130. The detector consists of a diode-rectifier, connected in series with the parallel combination of a resistor and a capacitor, with the voltage from the pickup coil 30a applied across the series combination. The detected output signal which is indicative of the right to left movement of the patient's jaw is available across the resistor element and is applied, as an illustrative example, to a recording pen amplifier which drives the recording pen. The movements recorded on a paper tape by the recording pen are indicative of the movements of the jaw in the left and right directions. In like manner the voltage from the pickup coil 28a is applied to a second detector device 132, recording pen amplifier and recording pen to produce a record of the movements of the jaw in the forward and back directions.

In order to record the angles in the front and back direction and right to left direction it is necessary to compare the voltages in the pickup coils which determine these angles. For example, to determine the right to left angle, the voltage from the pickup coil 22a is applied through a transformer 134 to one of a pair of detector elements 136 and a direct voltage is developed across the resistor of the detector element 136 which is indicative of the voltage induced in the pickup coil 22a. The voltage from the pickup coil 20a is applied to the second of the pair of rectifier elements 138 which detects the voltage from the pickup coil 20a to produce a direct voltage across its detector load resistor which is opposite in phase to that produced across the resistor of the first detector element of the pair. The low potential sides of the rectifiers are connected together and a matrixing resistor is connected between the high potential sides of the rectifiers.

With the teeth in the centric position, a slidable tap 142 on the matrixing resistor 140 is adjusted so that no voltage tap appears between the tap and the low potential side of the detector elements. Movement of the jaws will change the voltages induced in the pickup coils 20a and 22a and a signal will be available at the tap 142, the polarity and magnitude of which represent the angle value and its quadrant. The voltage available between the tap 142 on the matrixing resistor 140 and the common point of the detectors 136 and 138 is applied to a recording pen amplifier to drive a recording pen.

The absolute magnitude of the voltage developed in the coils 22a and 20a is representative of the distance between any selected point on the plane defined by the upper teeth and any selected point on the plane defined by the lower teeth. Thus, the sum of the voltages induced in the coils 22a and 20a may be detected to produce a direct voltage representative of the distance between such selected points. As shown in FIG. 9 this may be simply accomplished by connecting an auxiliary detector circuit 144 across the extremities of the secondaries of the transformer 134 and 135. The sum of the voltages in the coils 22a and 20a appears across these points and is detected by the detector 124 to produce an output signal representative of such vertical separation which is applied to a recording pen amplifier and recording pen.

The forward to back angle of the plane defined by the teeth of the upper and lower jaw will be represented by a voltage derived in the same manner as that for the right to left angle. Thus, the voltages from pickup coils 24a and 26a are applied to rectifier circuits 146 and 148 which may be identical to detector elements 136 and 138 previously described. A matrixing resistor 150 is connected to the detector element 146 and 148 in the same manner as the previously described matrixing resistor 140 across the detector elements 136 and 138. An adjustable tap 152 on the matrixing resistor 150 provides zero setting. A direct voltage, which in direction and magnitude determines the angle and quadrant of the front to back angle, is applied from the variable tap and common point of the rectifiers 146 and 148 to the recording pen amplifier and recording pen. These 5 records inscribed by the recording pens determine all relative positions of the upper and lower jaws as they are moved with respect to each other. The record thus produced is shown in FIG. 10 of the drawing. It will be noted that the relative positions of the jaws during any given movement may be observed for any instant of time during such movement by comparing the records along a vertical line (as viewed in FIG. 10).

What is claimed is:

1. Dental apparatus for providing information regarding the articulation of the pair of jaws, said apparatus comprising: means securable to one of a pair of jaws for providing a magnetic field and means securable to the other of such pair of jaws in energy-receiving relation to said field-producing means for producing an electrical signal indicative of change of relative position of such jaws.

2. Dental apparatus for providing information regarding the articulation of a pair of jaws, said apparatus comprising: a magnetic field producing element; a magnetic field-responsive element; and means for securing said elements to said jaws in fixed relation to each other in the centric position of such jaws.

3. Dental apparatus for providing information regarding the articulation of a pair of jaws, said apparatus comprising: means securable to one of a pair of jaws for providing a magnetic field and means securable to the other of such pair of jaws in energy-receiving relation to said field-producing means for producing an electrical signal indicative of change of relative position of such jaws; and means for producing a record of said signals.

4. The invention as defined by claim 2, said securing means comprising a first arch adapted to fit snugly over a portion of an upper jaw and a second arch adapted to fit snugly over a portion of the corresponding lower jaw, each arch having a lateral extension for supporting its associated element.

5. Dental apparatus for providing information regarding the articulation of a pair of jaws, said apparatus comprising: an electromagnet; a plurality of pickup coils arranged along fixed coordinate axes with respect to each other; means for securing said electromagnet to one jaw; and means for securing said coils to the other jaw in such manner that, in a given position of said jaws, said pickup coils are energized in prescribed amounts and direction by said electromagnet.

6. Dental apparatus for providing information regarding the articulation of a pair of jaws, said apparatus comprising: an electromagnet; a plurality of pickup coils arranged along fixed coordinate axes with respect to each other; means for securing said electromagnet to one jaw; and means for securing said coils to the other jaw in such manner that, in a given position of said jaws, said pickup coils are energized in prescribed amounts and direction by said electromagnet; and means for receiving signals from said coils as such jaws are moved relative to each other.

7. Dental apparatus for providing information regarding the articulation of a pair of jaws, said apparatus comprising: an electromagnet; a plurality of pickup coils arranged along fixed coordinate axes with respect to each other; means for securing said electromagnet to one jaw; and means for securing said coils to the other jaw in such manner that, in a given position of said jaws, said pickup coils are energized in prescribed amounts and direction by said electromagnet; and means for receiving signals from said coils as such jaws are moved relative to each other; and means for recording said signals.

8. The invention as defined by claim 7, said recording means comprising a plurality of styli corresponding in number to the number of coils and means for moving said styli in response to said derived signals.

9. The invention as defined by claim 6, wherein said fixed coordinate axes are mutually perpendicular to each other.

References Cited
UNITED STATES PATENTS 2,430,757  11/1947  Conrad et al. _____ 336—30

LOUIS G. MANCENE, *Primary Examiner.*

ROBERT E. MORGAN, *Examiner.*

N. RUSHEFSKY, *Assistant Examiner.*